US008971946B2

(12) United States Patent
Ahmed et al.

(10) Patent No.: US 8,971,946 B2
(45) Date of Patent: Mar. 3, 2015

(54) PRIVACY CONTROL IN PUSH-TO-TALK

(75) Inventors: Zafer Ahmed, Palatine, IL (US); Nan Zhong, Bellevue, WA (US)

(73) Assignee: TiKL, Inc., Sunnyvale, CA (US)

( * ) Notice: Subject to any disclaimer, the term of this patent is extended or adjusted under 35 U.S.C. 154(b) by 434 days.

(21) Appl. No.: 13/464,817

(22) Filed: May 4, 2012

(65) Prior Publication Data

US 2012/0289277 A1 Nov. 15, 2012

Related U.S. Application Data

(60) Provisional application No. 61/484,680, filed on May 11, 2011.

(51) Int. Cl.
*H04B 7/24* (2006.01)
*H04W 76/00* (2009.01)

(52) U.S. Cl.
CPC .................................. *H04W 76/005* (2013.01)
USPC .......................................... 455/518; 709/204

(58) Field of Classification Search
CPC ............................... H04W 76/005; H04W 4/10
USPC ........................................................ 455/518
See application file for complete search history.

(56) References Cited

U.S. PATENT DOCUMENTS

| | | | | |
|---|---|---|---|---|
| 4,955,083 A * | 9/1990 | Phillips et al. | ................... | 455/47 |
| 5,408,680 A * | 4/1995 | Hattey et al. | ..................... | 455/15 |
| 5,604,791 A * | 2/1997 | Lee | .............................. | 379/88.21 |
| 7,142,825 B2 * | 11/2006 | Marler et al. | ................. | 455/90.1 |
| 7,170,863 B1 * | 1/2007 | Denman et al. | ............... | 370/260 |
| 7,328,042 B2 * | 2/2008 | Choksi | ........................ | 455/552.1 |
| 7,379,735 B2 * | 5/2008 | Villa et al. | .................. | 455/426.1 |
| 7,400,917 B2 * | 7/2008 | Wood et al. | ................. | 455/575.8 |
| 7,596,224 B2 * | 9/2009 | Klug et al. | ..................... | 380/270 |
| 7,606,291 B2 * | 10/2009 | Fudally | .......................... | 375/132 |
| 7,692,579 B2 * | 4/2010 | Vassilovski | .............. | 342/357.31 |
| 7,801,953 B1 * | 9/2010 | Denman et al. | ............... | 709/204 |
| 7,917,589 B2 * | 3/2011 | Kronlund et al. | ............. | 709/206 |
| 8,001,181 B2 * | 8/2011 | Wilson et al. | ................. | 709/203 |
| 8,099,120 B2 * | 1/2012 | Drozt et al. | .................... | 455/518 |
| 8,380,236 B2 * | 2/2013 | Zhao et al. | .................... | 455/519 |
| 8,406,792 B2 * | 3/2013 | Aaltonen et al. | .............. | 455/466 |
| 8,428,237 B1 * | 4/2013 | Denman et al. | .......... | 379/202.01 |
| 8,474,007 B2 * | 6/2013 | Drozt et al. | ....................... | 726/1 |
| 8,478,358 B2 * | 7/2013 | Saito | .......................... | 455/569.2 |
| 8,495,679 B2 * | 7/2013 | Labeeb et al. | .................. | 725/46 |

(Continued)

*Primary Examiner* — Hai V Nguyen
(74) *Attorney, Agent, or Firm* — Zilka-Kotab, PC

(57) ABSTRACT

In one embodiment, a computer program product for suppressing incoming audio in a Push-To-Talk (PTT) session includes a computer readable storage medium having computer readable program code embodied therewith, the computer readable program code including computer readable program code configured for receiving a request sent from an originator communication device to initiate a PTT session at a receiver communication device, computer readable program code configured for establishing the PTT session between the originator communication device and the receiver communication device, computer readable program code configured for notifying a user at the receiver communication device that the PTT session has been established, computer readable program code configured for determining whether to suppress or audibilize incoming audio based on a privacy setting on the receiver communication device, and computer readable program code configured for suppressing or audibilizing the incoming audio according to the privacy setting.

20 Claims, 4 Drawing Sheets

(56) References Cited

U.S. PATENT DOCUMENTS

| | | | | |
|---|---|---|---|---|
| RE44,577 E | * | 11/2013 | Yafuso et al. | 370/270 |
| 8,582,749 B2 | * | 11/2013 | Strathmeyer et al. | 379/219 |
| 8,713,630 B2 | * | 4/2014 | Raleigh | 726/1 |
| 8,755,831 B2 | * | 6/2014 | Brewer et al. | 455/518 |
| 8,775,535 B2 | * | 7/2014 | Hugg et al. | 709/206 |
| 2003/0169859 A1 | * | 9/2003 | Strathmeyer et al. | 379/88.17 |
| 2004/0147231 A1 | * | 7/2004 | Marler et al. | 455/90.1 |
| 2005/0209858 A1 | * | 9/2005 | Zak | 704/275 |
| 2006/0046759 A1 | * | 3/2006 | Yoon et al. | 455/518 |
| 2006/0058007 A1 | * | 3/2006 | Choksi | 455/406 |
| 2006/0123224 A1 | * | 6/2006 | Klug et al. | 713/150 |
| 2007/0230678 A1 | * | 10/2007 | Bloebaum et al. | 379/211.01 |
| 2007/0266077 A1 | * | 11/2007 | Wengrovitz | 709/203 |
| 2008/0013600 A1 | * | 1/2008 | Fudally | 375/136 |
| 2008/0037574 A1 | * | 2/2008 | Huh et al. | 370/416 |
| 2008/0125096 A1 | * | 5/2008 | Aaltonen et al. | 455/412.2 |
| 2009/0262668 A1 | * | 10/2009 | Hemar et al. | 370/260 |
| 2009/0270049 A1 | * | 10/2009 | Zhao et al. | 455/90.2 |
| 2009/0292769 A1 | * | 11/2009 | Matsuzawa | 709/204 |
| 2009/0327435 A1 | * | 12/2009 | LoGalbo et al. | 709/206 |
| 2010/0233998 A1 | * | 9/2010 | Saito | 455/412.2 |
| 2010/0234057 A1 | * | 9/2010 | Drozt et al. | 455/518 |
| 2010/0289301 A1 | * | 11/2010 | Nakaguro et al. | 296/214 |
| 2012/0077536 A1 | * | 3/2012 | Goel et al. | 455/518 |
| 2012/0135775 A1 | * | 5/2012 | Drozt et al. | 455/518 |
| 2012/0185547 A1 | * | 7/2012 | Hugg et al. | 709/206 |
| 2013/0315107 A1 | * | 11/2013 | Lindner et al. | 370/277 |
| 2013/0315108 A1 | * | 11/2013 | Lindner et al. | 370/277 |
| 2013/0315110 A1 | * | 11/2013 | Razdan et al. | 370/277 |
| 2013/0316686 A1 | * | 11/2013 | Subbaramoo et al. | 455/418 |
| 2013/0316687 A1 | * | 11/2013 | Subbaramoo et al. | 455/418 |
| 2014/0222931 A1 | * | 8/2014 | Hemar et al. | 709/206 |

\* cited by examiner

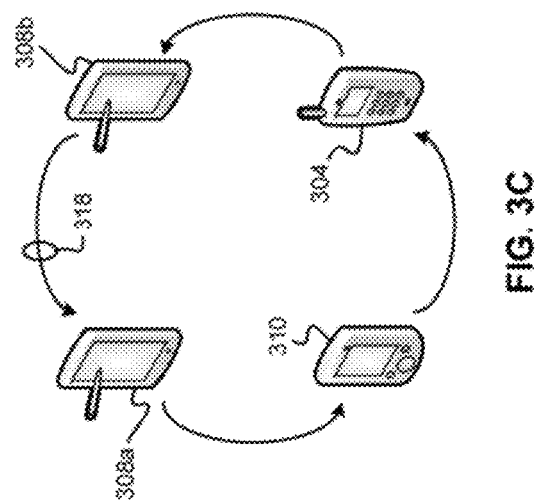
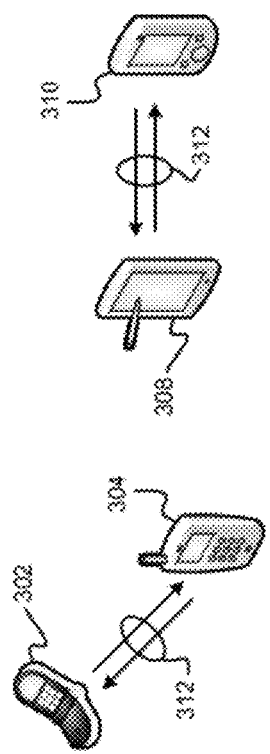
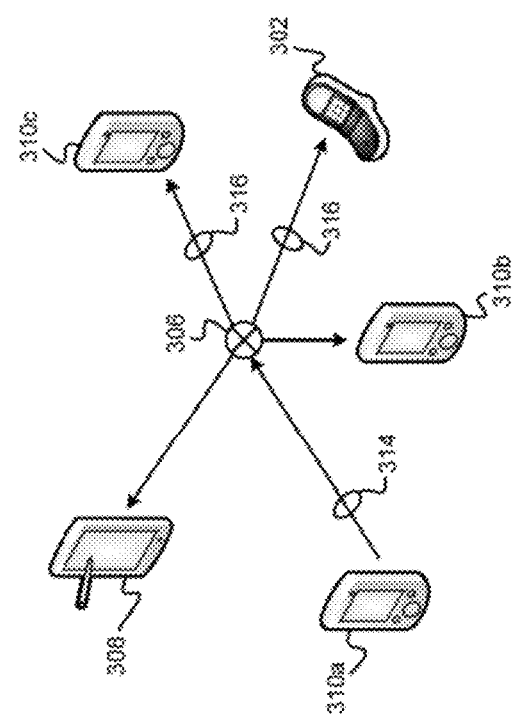
FIG. 3A
FIG. 3B
FIG. 3C

PRIVACY CONTROL IN PUSH-TO-TALK

RELATED APPLICATIONS

This application claims priority to U.S. Provisional Patent Application No. 61/484,680 filed on May 11, 2011, which is herein incorporated by reference.

FIELD OF THE INVENTION

The present invention relates to mobile communications, and more particularly, this invention relates to controlling privacy in a Push-to-Talk (PTT) communication session.

BACKGROUND

Communication devices, such as mobile telephones, smart phones, tablet-based personal computers, etc., are generally capable of transmitting and receiving voice calls and/or sending and receiving data over a wireless communication network. Conventional voice calls generally involve real time full duplex communication where two or more users communicate with each other in two of more directions simultaneously.

Push-to-Talk (PTT) is a form of real time one-to-one and one-to-group voice communication. Currently, PTT utilizes half duplex communication that enables communication devices to be used similar to handheld two-way transceivers, sometimes referred to as walkie-talkies. Specifically, communications between two or more users of these devices does not occur simultaneously, but instead only one user may transmit voice data at a time. With PTT, a user is able to speak to another individual or an entire group of people by simply initiating the transmission (usually by pressing a button) and speaking into a receiver of the communication device. The recipient(s) then immediately (or as immediate as possible depending on the communication network) hear the voice of the initiating user transmitted from out of a PTT device at the receiving end, usually over a speaker at a designated volume intended to broadcast the voice. Once the transmission is ended (usually by releasing the button), any participant in the communication may similarly initiate another PTT communication on their respective communication devices to talk back to the other participants.

PTT voice communication differs from conventional voice calls in that PTT does not require a user to answer a ringing phone to participate in a conversation. In contrast, PTT calls are typically immediate and unannounced. That is to say that the PTT call occurs as soon as the call is initiated, with no action required on the part of the recipient, and a receiving participant is not given an opportunity to refuse the call. While the immediacy of the voice transmission and playback makes PTT an efficient way to communicate, unannounced PTT calls may disturb the privacy of PTT recipient(s). For example, PTT recipient(s) may hear the PTT sender's voice—which is not under any of the recipients' control— played loudly on their communication devices, possibly in inappropriate situations.

Therefore, there is a current need for an improved method to either suppress or play a PTT communication without action required from a recipient at the time of the call.

SUMMARY

In one embodiment, a computer program product for suppressing incoming audio in a Push-To-Talk (PTT) session includes a computer readable storage medium having computer readable program code embodied therewith, the computer readable program code including computer readable program code configured for receiving a request sent from an originator communication device to initiate a PTT session at a receiver communication device, computer readable program code configured for establishing the PTT session between the originator communication device and the receiver communication device, computer readable program code configured for notifying a user at the receiver communication device that the PTT session has been established, commuter readable program code configured for determining whether to suppress or audibilize incoming audio based on a privacy setting on the receiver communication device, and computer readable program code configured for suppressing or audibilizing the incoming audio according to the privacy setting.

In another embodiment, a method for automatically suppressing incoming audio in a PTT session includes receiving a request sent from an originator communication device to initiate a PTT session at a receiver communication device, establishing the PTT session between the originator communication device and the receiver communication device, notifying a user at the receiver communication device that the PTT session has been established, automatically determining whether to suppress or audibilize incoming audio based on a privacy setting on the receiver communication device, and suppressing or audibilizing the incoming audio according to the privacy setting.

In yet another embodiment, a communication device includes a processor adapted for executing logic, logic adapted for receiving a request to initiate a PTT session with an originator communication device, logic adapted for establishing the PTT session with the originator communication device, logic adapted for notifying a user that the PTT session has been established, logic adapted for automatically determining whether to suppress or audibilize incoming audio based on a privacy setting, and logic adapted for suppressing or audibilizing the incoming audio according to the privacy setting.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIGS. 3A-3C illustrate three push-to-talk (PTT) communication schemes, according to various embodiments.

DETAILED DESCRIPTION

Figure 1:
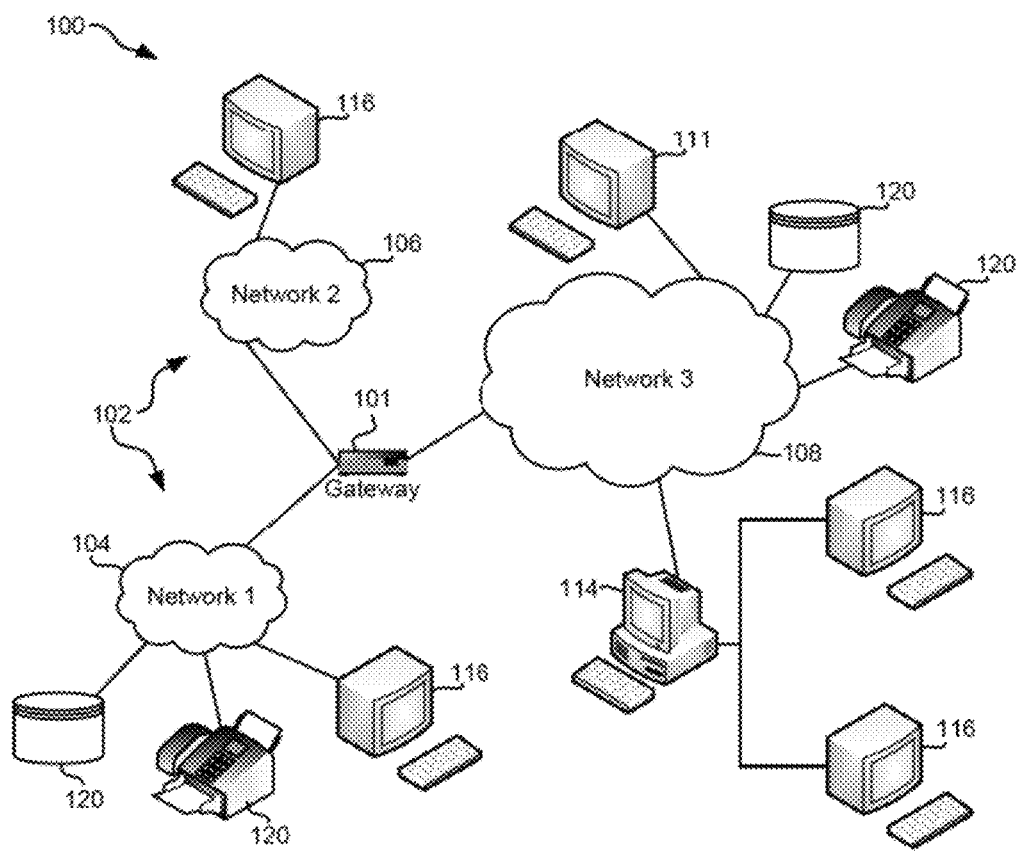
FIG. 1 illustrates a network architecture, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

The following description discloses several preferred embodiments for controlling privacy in a Push-To-Talk (PTT) communication session and/or related systems and methods thereof.

In one general embodiment, a computer program product for suppressing incoming audio in a PTT session includes a computer readable storage medium having computer readable program code embodied therewith, the computer readable program code including computer readable program code configured for receiving a request sent from an originator communication device to initiate a PTT session at a receiver communication device, computer readable program code configured for establishing the PTT session between the originator communication device and the receiver communication device, computer readable program code configured for notifying a user at the receiver communication device that the PTT session has been established, computer readable program code configured for determining whether to suppress or audibilize incoming audio based on a privacy setting on the receiver communication device, and computer readable program code configured for suppressing or audibilizing the incoming audio according to the privacy setting.

In another general embodiment, a method for automatically suppressing incoming audio in a PTT session includes receiving a request sent from an originator communication device to initiate a PTT session at a receiver communication device, establishing the PTT session between the originator communication device and the receiver communication device, notifying a user at the receiver communication device that the PTT session has been established, automatically determining whether to suppress or audibilize incoming audio based on a privacy setting on the receiver communication device, and suppressing or audibilizing the incoming audio according to the privacy setting.

In yet another general embodiment, a communication device includes a processor adapted for executing logic, logic adapted for receiving a request to initiate a PTT session with an originator communication device, logic adapted for establishing the PTT session with the originator communication device, logic adapted for notifying a user that the PTT session has been established, logic adapted for automatically determining whether to suppress or audibilize incoming audio based on a privacy setting, and logic adapted for suppressing or audibilizing the incoming audio according to the privacy setting.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems.

One skilled in the art will recognize that the present invention is not limited to the use of the Internet as a communication medium and that alternative methods of the invention may accommodate the use of a private intranet, a Local Area Network (LAN), a Wide Area Network (WAN), a Virtual Local Area Network (VLAN), or some other type of communication. In addition, various combinations of wired, wireless (e.g., radio frequency), and optical communication links may be utilized.

The program environment in which one embodiment of the invention may be executed illustratively incorporates one or more general-purpose computers or special-purpose devices such as hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a non-volatile computer program product comprising a computer readable medium having computer code thereon, which may be executed by a computing device (e.g., a processor) and/or system. A computer readable medium can include any medium capable of storing computer code thereon for use by a computing device or system, including optical media (e.g., read-only and writeable Compact Disc (CD), Digital Versatile Disc (DVD), and BLU-RAY disc (BD)), magnetic memory or medium (e.g., hard disk drive, tape), semiconductor memory (e.g., FLASH memory and other portable memory cards), etc.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
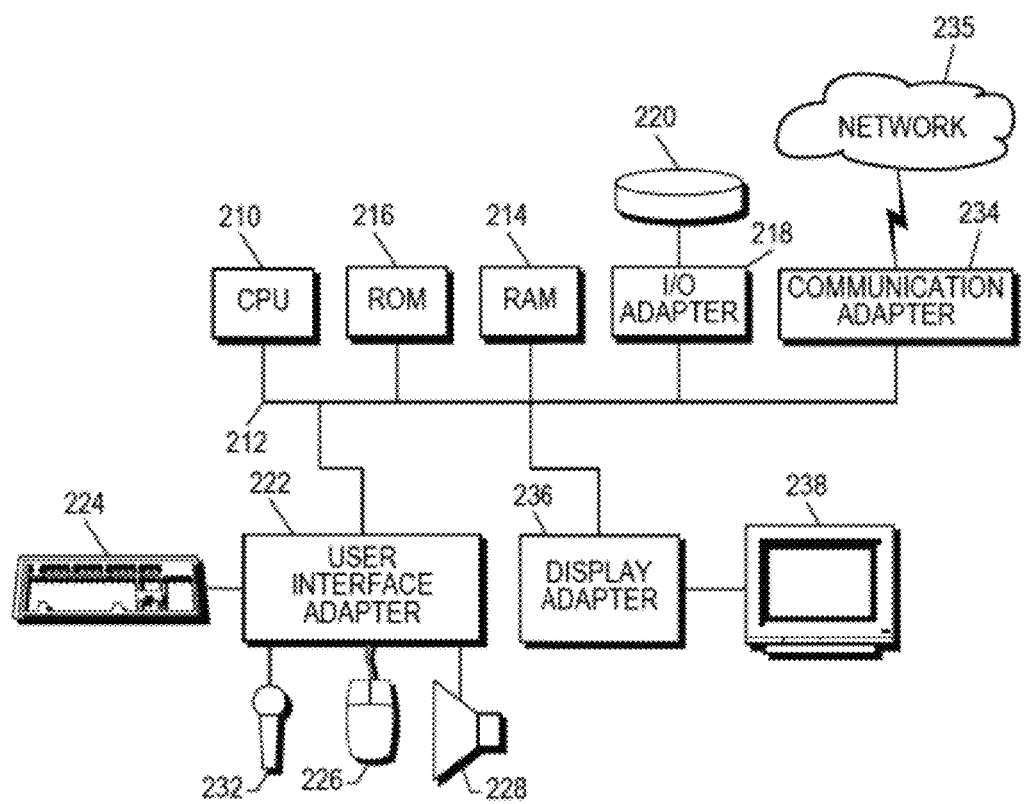
FIG. 2 shows a representative hardware environment according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

FIG. 3A depicts two one-to-one PTT sessions between two communication devices 302, 304 and communication devices 308, 310. The PTT session utilizes communications 312 which may comprise half duplex communications where communications occur in both directions between the communication devices, but in only one direction at any given tune, full duplex communications where communications occur in both directions between the communication devices with any communication device being capable of originating a message at any given time, regardless of the actions of any other communication device.

With half duplex communications, only one communication device is capable of transmitting, while the other communication device is listening. If both communication devices attempt to transmit at the same time, neither communication device will be listening for the other's transmission.

With full duplex communications, any device is capable of transmitting simultaneously with any other communications device. The communications may then be mixed together in a full partied PTT session, such as a conference call based on a PTT platform.

As shown, a mobile phone 302 may establish a PTT communication 312 with a dedicated PTT device 304. Additionally, a tablet-based device 308 may establish a PTT communication 312 with a smart phone 310. However, FIG. 3A is not meant to be limiting in any way on the types or numbers of communications devices which may be used as PTT communications may occur between any computing device that has a speaker/microphone and logic adapted for interpreting the communications.

Any type of communication device capable of PTT sessions may be used, including those shown and any others known in the art. For example, as used herein, a mobile phone 302 may communicate over one or more wireless networks including, but not limited to, Global System for Mobile Communications (GSM), Code Division Multiple Access (CDMA), WAN including Wi-Fi, LAN, VLAN, etc. Mobile phones 302, as used herein, may be capable of sending and receiving voice calls along with other functionality associated with phone calls. In addition, some mobile phones 302 may also be capable of simple data applications, such as texting, short message service (SMS), image transmission, downloading applications (apps) from app stores, etc. Specific, but not limiting examples of mobile phones 302 include MOTOROLA RAZR, flip-phones, BLACKBERRY devices, etc.

Some app stores which may have content which may be downloaded to any communication device described herein may include AMAZON APPSTORE, APPLE APP STORE, ANDROID MARKET, GOOGLE PLAY, etc.

Additionally, as used herein, the dedicated PTT device 304 may include, but is not limited to, handheld two-way radio transceivers, walkie-talkies, citizens band (CB) radio devices, and other dedicated PTT devices as would be recognized by one having ordinary skill in the art upon reading the present disclosure.

The tablet-based devices 308 may be any device typically accepted as having a tablet form factor, and may be capable of advanced computer operations, including functionality available to any netbook, notebook, laptop, or desktop computer, including mobile communication protocols and downloading apps from app stores in some approaches. Some suitable examples of tablet-based devices 308 may include, but are not limited to, APPLE iPAD, SAMSUNG GALAXY TAB, AMAZON KNIDLE, BARNES & NOBLE NOOK, MICROSOFT TABLET Personal Computers (PCs), HP SLATE, HP TOUCHPAD, etc.

Further, smart phones 310 may have increased functionality over mobile phones 302, as used herein. Smart phones 310 may be capable of sending and receiving phone calls like mobile phones 302, but may also be capable of sending and receiving data, accessing the Internet, synching with email, calendars, downloading apps from app stores, etc., as would be known in the art. Smart phones 310 may include a touchscreen or some other advanced user interface capable of receiving user input beyond simple voice commands or button pushes. Some specific examples of smart phones 310 include, but are not limited to, iPHONES, ANDROID-based smart phones such as MOTOROLA DROID, HTC EVO, GOOGLE NEXUS, etc., MICROSOFT WINDOWS-based smart phones, and other smart phones as would be recognized by one having ordinary skill in the art.

FIG. 3B depicts a one-to-group PTT session between an originator communication device and multiple receiver communication devices. In one embodiment, smart phone 310a may be the originator communication device that transmits the initiating PTT communication 314. The initiating PTT communication 314 may first be transmitted to a hub 306. The hub 306 next transmits the PTT communication 316 to multiple receiving communication devices, such as a mobile phone 302, smart phone 310b, smart phone 310c, and a tablet-based device 308. In some approaches, the hub 306 may be present on the originator communication device 310a, or it may be located remotely as part of the communication network being utilized for the PTT communications 314. It should be noted that the receiving communication devices may all be different types of communication devices, some similar and some different devices, multiples of certain communication devices, or any combination thereof, as long as each device is capable of receiving PTT communications 316.

Additionally, a hub 306 may include, but is not limited to, a multiport repeater, dynamic router, static router, switch and other hubs as would be understood by one having ordinary skill in the art upon reading the present disclosure.

As illustrated in FIGS. 3B and 3C, any number of communication devices may be used, and any type of communication device may be used, in any plurality.

In another embodiment, as shown in FIG. 3C, a tablet-based device 308b may be an originator communication device that initiates a cyclical PTT session 318. For example, a tablet-based device 308b may first transmit an initiating PTT communication to another tablet-based device 308a. The tablet-based device 308a may then transmit a PTT communication to a smart phone 310. Next, the smart phone 310 may transmit a PTT communication to a dedicated PTT device 304. The dedicated PIT device 304 may then transmit a PTT communication to the tablet-based device 308b, which ends the cyclical session. Accordingly, the cyclical PTT session is just an example of point-to-point communication between devices.

Figure 4:
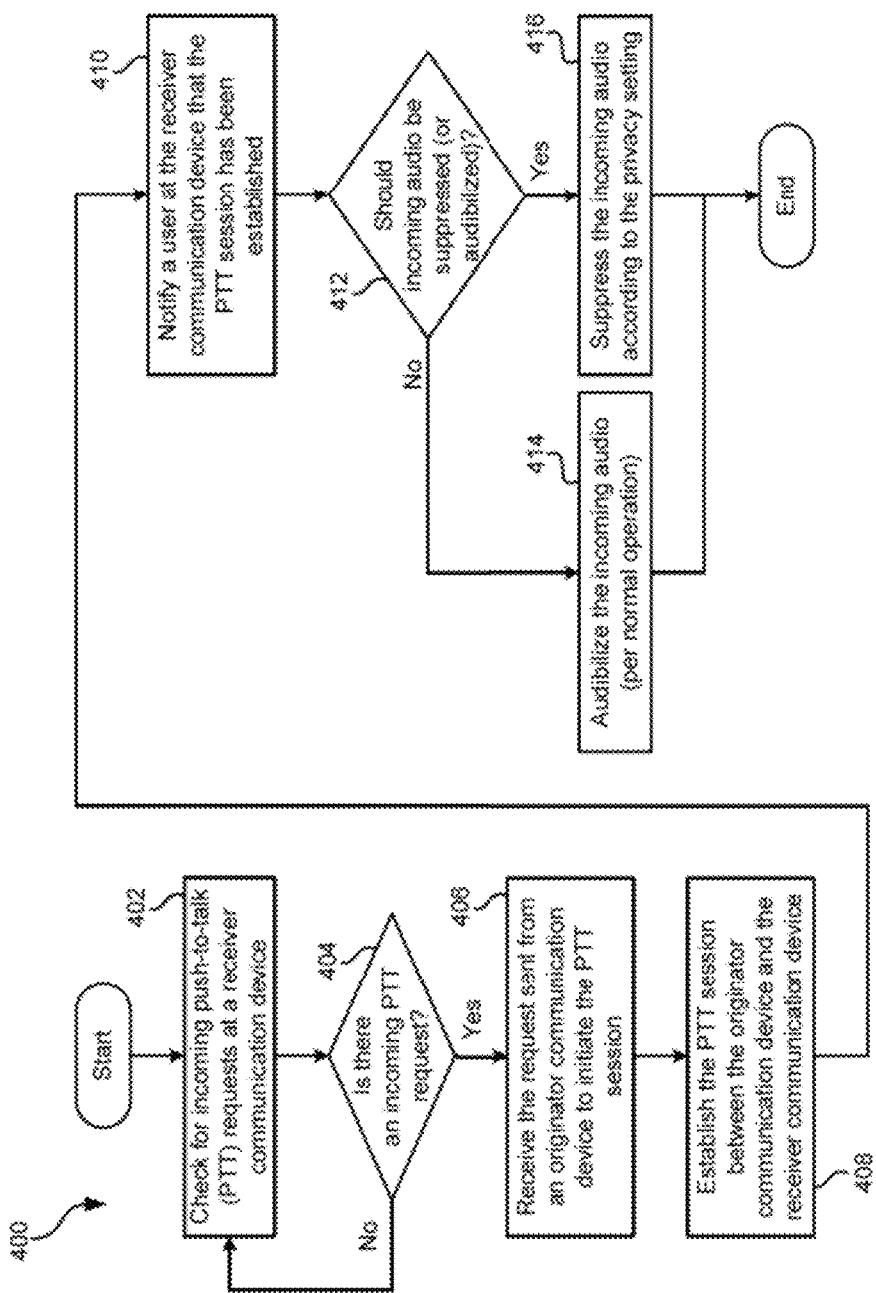
FIG. 4 depicts a flowchart of a method, according to one illustrative embodiment.

FIG. 4 shows a method 400 that may be used to determine whether to allow or suppress an incoming PTT session, including any audio transmissions that may follow the initialization of the PTT session. It should be noted that the method 400 may be carried out in any desired environment, including but not limited to those shown in FIGS. 1-3C, in various approaches. Moreover, more or less operations than those shown in FIG. 4 may be included in method 400, according to various embodiments. Additionally, any of the aforementioned features may be used in any of the embodiments described in accordance with the various methods.

After the method 400 starts, as shown in optional operation 402, a first receiver communication device checks for any incoming PIT requests. If an incoming PTT request is detected in optional operation 404, the first receiver communication device receives the request sent from an originator communication device as shown in operation 406. Once the first receiver communication device receives the PTT request, a PTT session may be established between the originator communication device and the receiver communication device as shown in operation 408.

The communication devices described herein may have the capability to communicate over one or more wireless networks, including, but not limited to, 2G packet switched networks, 2.5G packet switched networks, 3G packet switched networks, 4G packet switched networks (4G LTE, etc.), GSM, CDMA, Wi-Fi, and other networks as would be recognized by one having ordinary skill in the art upon reading the present disclosure. Moreover, a communication device may operate in accordance with technologies developed by various standard bodies including, but not limited to, the Open Mobile Alliance (OMA), 3rd General Partnership 2 (3GPP2), the Institute of Electrical and Electronics Engineers (IEEE), etc. As used herein, communication devices may include, but are not limited to, mobile phones, smart phones, cellular phones, mobile radios, personal digital assistants, tablets, laptops, personal computers (PCs), mobile PCs, etc. Some examples of suitable communication devices include, but are not limited to, APPLE iPHONEs, ANDROID-based smart phones, APPLE iPADs, two-way radio receivers, GALAXY TABs, AMAZON KINDLEs etc.

Additionally, in one embodiment, the incoming PTT communication may be accompanied by other data that may be provided to the user via the receiver communication device during suppressing of the incoming audio. Other data may include, but is not limited to, audio, video, text, image, identifying data, vibration signal, etc., and other suitable data as would be understood by one having ordinary skill in the art upon reading the present disclosure.

In one such embodiment, a picture of a person attempting to establish a PTT session may be displayed on the receiver communication device, a certain vibration pattern may be produced by the receiver communication device, a particular ringtone may be played by the communication device, etc.

Further, in one embodiment, the PTT session may involve a one-to-one PTT session, such as that shown in FIG. 3A according to one embodiment. Specifically, a one-to-one PTT session may involve PTT communication between two communication devices, an originator communication device and a receiver communication device. In another embodiment, the PIT session may involve a one-to-group PTT session using multiple receiver communication devices, such as that shown in FIG. 3B according to one embodiment.

As shown in operation 410, the user may be visibly or audibly notified at the receiver communication device that the incoming PTT session has been established. As used herein, an audible notification may include, but is not limited to, a beep, a ringtone, voice instruction, a song, singing, chiming, and any other audible notifications as would be recognized by one having ordinary skill in the art upon reading the present disclosure. Examples of a visible notification may include, but are not limited to, display of the PTT sender's telephone number or other identification information, display of the PTT sender's location, display of the PTT sender's picture, display of a graphic associated with the sender, etc.

As shown in operation 412, an automatic determination may be made to suppress or audibilize the incoming PTT audio based on a privacy setting on the receiver communication device. For example, the user's chosen privacy settings may dictate a YES or NO determination at the beginning of the PTT session, resulting in the PTT communication being played or suppressed, respectively.

In one embodiment, the user may select the privacy setting to either audibilize or suppress the incoming audio. In one embodiment, a user may select the privacy setting to either audibilize or suppress the incoming audio through a graphical user interface (GUI). For example, if the receiver communication device has privacy selected to suppress the incoming audio, then when the PTT session is initiated, the incoming audio from the originator communication device will not be audible on the receiver communication device, until and unless the user makes a selection to allow the incoming audio to be audibilized. In one approach, any incoming audio that was transmitted prior to selection to allow audibilization will not be audibilized. In another approach, any incoming audio that was transmitted prior to selection to allow audibilization will be stored and audibilized once the selection is made.

In yet another embodiment, the privacy setting determinative of either suppressing or audibilizing the incoming audio may be automatically selected by the receiver communication device based on a condition. For example, the condition may include, but is not limited to, a silent mode being active, a vibrate mode being active, a plane mode being active, a position of the receiver communication device relative to a reference position, an orientation of the receiver communication device relative to the reference position, recent movement of the receiver communication device, a velocity of the receiver communication device movement, a geographical location of the receiver communication device, a current time, user data stored to the receiver communication device, a user input to the receiver communication device, ambient noise detected by the receiver communication device, etc.

In some examples, if a device is in silent mode, then PTT communication will not be audibilized; if a device is positioned vertically (e.g., it is positioned in a pocket, on a belt clip, in a briefcase, etc.) then PTT communication will not be audibilized; if a device is tilted (like when being used for entering text or accessing the Internet, then PTT communication will be audibilized; if the device is located at a user's home, then PTT communication will be audibilized; if the device detects no ambient noise, then PTT communication will not be audibilized, etc. There are a limitless amount of scenarios that may be envisioned where it may be more proper to suppress incoming audio rather than playing it out loud for all around the communication device to hear, and any setting which accounts for these situations may be enacted by a user or by the device automatically, based on any conditions that may be detected about, by, for, or through the device.

If operation 412 results in a YES determination, i.e., the device is in "polite mode," the incoming PTT audio may be suppressed as shown in operation 416. The suppression of the PTT audio may be achieved in various ways. For example, in one embodiment, the incoming PTT audio may be silenced. In another embodiment, the incoming PTT audio may be audibilized at a lower volume than when not suppressing the incoming audio. In yet another embodiment, the incoming PTT audio may be sent to an alternate audio channel of the receiver communication device with the proviso that the incoming audio is not sent to a main speaker of the receiver communication device.

Examples of an alternate audio channel may include, but are not limited to, a radio frequency interface, BLUETOOTH, a headset jack, etc. The main speaker of the communication device may be a speaker capable of volumes greater than the earpiece speaker that is used during telephone conversations, such as the speaker for speakerphone operation in one approach, or it may be the earpiece speaker that is simply used at an elevated volume, in other approaches.

According to one approach, the audio may be suppressed until a user on the receiver communication device talks back to the user on the originator communication device. Once the user on the receiver communication device presses a PTT button to respond, the audio is enabled for the rest of the PTT session. Polite mode ensures that audio is not played on the receiver communication device until the user on the receiver communication device acknowledges the PTT session has been initiated. In one embodiment, the receiver communication device may audibly alert the user of the PTT session and when the user on the receiver communication device answers back, the user on the originator communication device is able to talk to the user on the receiver communication device. By enforcing polite mode, there is no possibility that audio will be broadcast on the receiver communication device while the receiving user is in a situation where the audio may be unwelcomed, such as during a meeting or some other situation where privacy is needed.

Users of PTT systems typically adhere to PTT manners when using the devices, such that the originating user will not talk until the PTT session is acknowledged by the receiving user. However, there is absolutely nothing in PTT schemes currently that enforces this behavior. Accordingly, an originating user may simply begin talking to the receiving user without ever determining if the conversation being held is appropriate for the setting in which the receiving user is situated. This problem is overcome with certain embodiments described herein, where the originating user's voice is muted until such time that the receiving user indicates that the PTT session should be started. This ensures that PTT manners are adhered to, even if the originating user does not voluntarily adhere to them, since the receiver communication device will not audibilize the originating user's voice until the receiving user allows it.

If operation 412 results in a NO determination, the incoming PTT audio is audibilized as shown in operation 414. Additionally, once the recipient presses the PTT button on a communication device to talk back, operation 412 may yield a NO determination for the remainder of the PTT session. Moreover, in another embodiment, the user may give a voice-activated command rather than pushing a PTT button to talk back or any other method of indicating a willingness to join the PTT session.

In another embodiment, the method 400 as described herein and shown in FIG. 4, may be implemented as a computer program product having a computer readable storage medium and computer readable program code embodied therewith. In accordance with one embodiment, computer readable program code may be configured to: receive a request sent from an originator communication device and the receiver communication device; establish the PTT session between the originator communication device and the receiver communication device; notify a user at the receiver communication device that the PTT session has been established; determine whether to suppress or audibilize incoming audio based on a privacy setting on the receiver communication device; and suppress or audibilize the incoming audio according to the privacy setting. Any other approaches and/or embodiments described herein may also be used in conjunction with the computer program product as would be understood by one of skill in the art upon reading the present descriptions.

In one embodiment, the computer program product may be embodied in an app accessible on a remotely located (in proximity to the communication device) and wirelessly accessible server, such as an app store of some kind. In this way, the computer program product may be downloaded from the app store as an executable to be installed on the communication device for use in PTT communications with other communication devices which have downloaded the app. Of course, other methods of obtaining the computer program product may be used as known in the art.

In yet another embodiment, the method described herein and shown in FIG. 4 may be implemented as a communication device to automatically suppress incoming audio in a PTT session. The communication device may include a processor adapted for executing logic, such as a CPU, FPGA, ASIC, etc. Additionally, the communication device may include logic adapted for: receiving a request to initiate a PTT session with an originator device; establishing the PTT session with the originator communication device; notifying a user that the PTT session has been established; automatically determining whether to suppress or audibilize incoming audio based on a privacy setting; and suppressing or audibilizing the incoming audio according to the privacy setting. Any other approaches and/or embodiments described herein may also be used in conjunction with the computer program product as would be understood by one of skill in the art upon reading the present descriptions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product for suppressing incoming audio in a push-to-talk (PTT) session, the computer program product comprising a non-transitory computer readable storage medium having computer readable program code embodied therewith, the computer readable program code comprising:
- computer readable program code configured to receive a request sent from an originator communication device to initiate a PTT session at a receiver communication device;
- computer readable program code configured to establish the PTT session between the originator communication device and the receiver communication device regardless of a privacy setting of the receiver communication device;
- computer readable program code configured to notify a user at the receiver communication device that the PTT session has been established;
- computer readable program code configured to determine an action based on the privacy setting on the receiver communication device, the action being selected from a group consisting of: suppressing incoming audio originating from the originator communication device, and audibilizing the incoming audio originating from the originator communication device; and
- computer readable program code configured to carry out the action according to the privacy setting.

2. The computer program product as recited in claim 1, further comprising computer readable program code configured to allow the user to select the privacy setting to determine the action.

3. The computer program product as recited in claim 1, wherein the computer readable program code configured to carry out the action comprises computer readable program code configured to suppress the incoming audio by audibilizing the incoming audio at a lower volume than when audibilizing the incoming audio when the action is determined to be suppressing the incoming audio.

4. The computer program product as recited in claim 1, wherein the computer readable program code configured to carry out the action comprises computer readable program code configured to suppress the incoming audio by sending the incoming audio to an alternate audio channel of the receiver communication device when the action is determined to be suppressing the incoming audio with a proviso that the incoming audio is not sent to a main speaker of the receiver communication device.

5. The computer program product as recited in claim 4, wherein the alternate audio channel comprises at least one of: a radio frequency interface and a headset jack.

6. The computer program product as recited in claim 1, further comprising computer readable program code configured to select the privacy setting based on a condition being satisfied.

7. The computer program product as recited in claim 6, wherein satisfaction of the condition is based on at least one of: a silent mode being active, a vibrate mode being active, a position of the receiver communication device relative to a reference position, an orientation of the receiver communication device relative to the reference position, recent movement of the receiver communication device, a velocity of the receiver communication device movement, a geographical location of the receiver communication device, a current time, user data stored to the receiver communication device, a user input to the receiver communication device, and ambient noise detected by the receiver communication device.

8. The computer program product as recited in claim 6, wherein the computer readable program code configured to carry out the action comprises computer readable program code configured to suppress the incoming audio by silencing the incoming audio when the action is determined to be suppressing the incoming audio, and wherein satisfaction of the condition is based on at least one of: a position of the receiver communication device relative to a reference position, an orientation of the receiver communication device relative to the reference position, recent movement of the receiver communication device, a velocity of the receiver communication device movement, a geographical location of the receiver communication device, a current time, and ambient noise detected by the receiver communication device.

9. The computer program product as recited in claim 1, wherein the PTT session is selected from a group consisting of: a one-to-one PTT session and a one-to-group PTT session using multiple receiver communication devices.

10. The computer program product as recited in claim 1, wherein the incoming audio is accompanied by other data, and further comprising computer readable program code configured to provide the other data to the user via the receiver communication device during suppressing of the incoming audio.

11. The computer program product as recited in claim 10, wherein the other data comprises at least one of: video, text, image, identifying data, and vibration.

12. A method for automatically suppressing incoming audio in a push-to-talk (PTT) session, the method comprising:
- receiving a request sent from an originator communication device to initiate a PTT session at a receiver communication device;
- establishing the PTT session between the originator communication device and the receiver communication device;
- notifying a user at the receiver communication device that the PTT session has been established;
- automatically determining whether to suppress or audibilize incoming audio based on a privacy setting on the receiver communication device; and
- suppressing or audibilizing the incoming audio according to the privacy setting.

13. The method as recited in claim 12, further comprising allowing the user to select the privacy setting to either audibilize or suppress the incoming audio.

14. The method as recited in claim 12, wherein suppressing the incoming audio comprises at least one of: audibilizing the incoming audio at a lower volume than when not suppressing the incoming audio, silencing the incoming audio, and sending the incoming audio to an alternate audio channel of the receiver communication device with the proviso that the incoming audio is not sent to a main speaker of the receiver communication device.

15. The method as recited in claim 14, wherein the alternate audio channel comprises at least one of: a radio frequency interface and a headset jack.

16. The method as recited in claim 12, wherein the privacy setting is automatically selected by the receiver communication device based on a condition.

17. The method as recited in claim 16, wherein the condition comprises at least one of: a silent mode being active, a vibrate mode being active, a position of the receiver communication device relative to a reference position, an orientation of the receiver communication device relative to the reference position, recent movement of the receiver communication device, a velocity of the receiver communication device movement, a geographical location of the receiver communication device, a current time, user data stored to the receiver communication device, a user input to the receiver communication device, and ambient noise detected by the receiver communication device.

18. The method as recited in claim 12, wherein the PTT session is a one-to-one PTT session or a one-to-group PTT session using multiple receiver communication devices.

19. The method as recited in claim 12, wherein the incoming audio is accompanied by other data, and wherein the other data is provided to the user via the receiver communication device during suppressing of the incoming audio.

20. A communication device, comprising:
 a processor configured to execute logic;
 logic configured to receive a request to initiate a push-to-talk (PTT) session with an originator communication device;
 logic configured to establish the PTT session with the originator communication device;
 logic configured to notify a user that the PTT session has been established;
 logic configured to automatically select a privacy setting based on a condition being satisfied, satisfaction of the condition being based on at least one of:
  a position of the communication device relative to a reference position;
  an orientation of the communication device relative to the reference position;
  recent movement of the communication device;
  a velocity of movement of the communication device;
  a geographical location of the communication device;
  a current time; and
  ambient noise being detected by the communication device;
 logic configured to automatically determine an action based on a privacy setting, the action being selected from a group consisting of: suppressing incoming audio originating from the originator communication device, and audibilizing the incoming audio originating from the originator communication device; and
 logic configured to carry out the action according to the privacy setting.

* * * * *